US008886890B2

(12) United States Patent
Tammam et al.

(10) Patent No.: US 8,886,890 B2
(45) Date of Patent: Nov. 11, 2014

(54) ADAPTIVE CONFIGURATION OF CACHE

(75) Inventors: Ariel Tammam, Ramat-Gan (IL); Roye Cohen, Zefat (IL)

(73) Assignee: SAP Portals Israel Ltd, Ra'anana (IL)

( * ) Notice: Subject to any disclaimer, the term of this patent is extended or adjusted under 35 U.S.C. 154(b) by 238 days.

(21) Appl. No.: 13/534,737

(22) Filed: Jun. 27, 2012

(65) Prior Publication Data

US 2014/0006723 A1 Jan. 2, 2014

(51) Int. Cl.
*G06F 12/08* (2006.01)

(52) U.S. Cl.
USPC .................................. 711/146; 711/E12.033

(58) Field of Classification Search
CPC . G06F 12/08; G06F 12/0817; G06F 12/0826; G06F 12/0842; G06F 17/30902; G06F 9/3004; G06F 9/30087; G06F 9/45504; G06F 11/1456; G06F 11/1641; G06F 11/2015; G06F 12/00; G06F 12/0866; G06F 17/21
USPC .......................................... 711/146, E12.033
See application file for complete search history.

(56) References Cited

U.S. PATENT DOCUMENTS

| | | |
|---|---|---|
| 2006/0288094 A1 | 12/2006 | Asplund |
| 2007/0250665 A1 | 10/2007 | Shimada |
| 2009/0228660 A1 | 9/2009 | Edwards et al. |
| 2010/0049775 A1 | 2/2010 | Rajawat |
| 2010/0115205 A1 | 5/2010 | Brown et al. |
| 2010/0199039 A1 | 8/2010 | Bauman et al. |
| 2010/0250857 A1 | 9/2010 | Matsui |
| 2011/0314226 A1* | 12/2011 | Cho .............................. 711/129 |

OTHER PUBLICATIONS

'Amazon elastic compute cloud' [online]. Wikipedia, 2011, [retrieved on Jun. 27, 2012]. Retrieved from the Internet: <URL: http://en.wikipedia.org/w/index.php?title=Amazon_Elastic_Compute_Cloud&oldid=429895998>, 9 pages.
'Cache algorithms' [online]. Wikipedia, 2011, [retrieved on Jun. 27, 2012]. Retrieved from the Internet: <URL: http://en.wikipedia.org/w/index.php?title=Cache_algorithms&oldid=431657295>, 5 pages.
'Cache (computing)' [online]. Wikipedia, 2011, [retrieved on Jun. 27, 2012]. Retrieved from the Internet: <URL: http://en.wikipedia.org/w/index.php?title=Monolithic_system&oldid=433549114>, 5 pages.
'How to clear BW/(SAP AS) caches' [online]. SAP, 2011, [retrieved on Jun. 27, 2012]. Retrieved from the Internet: <URL: http://scn.sap.com/people/martin.maruskin2/blog/2011/01>, 2 pages.

(Continued)

*Primary Examiner* — Yong Choe
(74) *Attorney, Agent, or Firm* — Fish & Richardson P.C.

(57) ABSTRACT

A computer-implemented method for adaptively configuring a cache includes: implementing a cache adaptation agent in a system that has multiple applications, the system including a memory and a disk storage, wherein the system creates a cache in the memory for use by each of the applications; monitoring, by the cache adaptation agent, the cache in use by at least one of the applications, the monitoring covering at least a size of the cache used by the application, how many objects are in the application's cache, and sizes of the objects in the application's cache; and configuring, by the cache adaptation agent and based on the monitoring, at least one of the cache and system behavior regarding at least one of the applications.

17 Claims, 4 Drawing Sheets

(56) References Cited

OTHER PUBLICATIONS

'How to differentiate between time to live and time to idle in encache' [online]. Stack overflow, 2010, [retrieved on Jun. 27, 2010]. Retrieved from the Internet: <URL: http://stackoverflow.com/questions/2583429/how-to-differentiate-between-time-to-live-and-time-to-idle-in-ehcache>, 3 pages.

'Memory management' [online]. Wikipedia, 2011, [retrieved on Jun. 27, 2012]. Retrieved from the Internet: <URL: http://en.wikipedia.org/w/index.php?title=Memory_management&oldid=429180908>, 3 pages.

'Monolithic system' [online]. Wikipedia, 2011, [retrieved on Jun. 27, 2012]. Retrieved from the Internet: <URL: http://en.wikipedia.org/w/index.php?title=Monolithic_system&oldid=433549114>, 1 page.

'OLAP cache optimisation' [online]. Scene Intelligence, 2011, [retrieved on Jun. 27, 2012]. Retrieved from the Internet: <URL: http://www.skeneintelligence.com/2011/02/cache/>, 9 pages.

'Quality of Service' [online]. Wikipedia, 2011, [retrieved on Jun. 27, 2012]. Retrieved from the Internet: <URL: http://en.wikipedia.org/w/index.php?title=Quality_of_service&oldid=427815374>, 10 pages.

"SAP NetWeaver Portal 7.3—Tuning Caches," *SAP AG*, 2011, 11 pages.

'Service-level agreement' [online]. Wikipedia, 2011, [retrieved on Jun. 27, 2012]. Retrieved from the Internet: <URL: http://en.wikipedia.org/w/index.php?title=Service-level_agreement&oldid=429363615>, 4 pages.

'2011 SAP: Cache manager brings up action connection resolution' [online]. SAP, 2011, [retrieved on Jun. 27, 2012]. Retrieved from the Internet: <URL: http://groups.google.com/group/xsi_list/browse_thread /thread/90b4b73077fb9521>, 7 pages.

\* cited by examiner

FIG. 5

ADAPTIVE CONFIGURATION OF CACHE

BACKGROUND

A cache is a vital module in any large system. The system has a cache module or infrastructure that can be configured. The cache is divided into multiple areas and each area represents a cost to the owner of maintaining the cache, and the cache is managed by the system to aid the functional operations of applications or other software.

One example of cache management is that virtually everything is cached. This improves performance response times, but because the cache needs to be large enough to hold all that information, the cost of ownership increases with this approach.

Another example of cache management is that virtually nothing (or only a small fraction of information) is cached. This can help minimize the memory footprint of the system, but the system response time deteriorates because essentially every operation requires a call to the database.

Sometimes a customer configuration is arranged by first simulating a load test on the system, analyzing the results and deciding the optimal configuration. However, the configuration thus chosen may be less optimal for use in other scenarios. Also, the configuration may be less optimal when used by other customers in the same scenario, or even when used by the same customer at a different time.

SUMMARY

In a first aspect, a computer-implemented method for adaptively configuring a cache includes: implementing a cache adaptation agent in a system that has multiple applications, the system including a memory and a disk storage, wherein the system creates a cache in the memory for use by each of the applications; monitoring, by the cache adaptation agent, the cache in use by at least one of the applications, the monitoring covering at least a size of the cache used by the application, how many objects are in the application's cache, and sizes of the objects in the application's cache; and configuring, by the cache adaptation agent and based on the monitoring, at least one of the cache and system behavior regarding at least one of the applications.

In a second aspect, a computer program product is embodied in a non-transitory computer-readable storage medium and includes instructions that when executed by a processor perform a method for adaptively configuring a cache. The method includes: implementing a cache adaptation agent in a system that has multiple applications, the system including a memory and a disk storage, wherein the system creates a cache in the memory for use by each of the applications; monitoring, by the cache adaptation agent, the cache in use by at least one of the applications, the monitoring covering at least a size of the cache used by the application, how many objects are in the application's cache, and sizes of the objects in the application's cache; and configuring, by the cache adaptation agent and based on the monitoring, at least one of the cache and system behavior regarding at least one of the applications.

In a third aspect, a system includes: one or more processors; and computer program product embodied in a non-transitory computer-readable storage medium and including instructions that when executed by a processor perform a method for adaptively configuring a cache. The method includes: implementing a cache adaptation agent in a system that has multiple applications, the system including a memory and a disk storage, wherein the system creates a cache in the memory for use by each of the applications; monitoring, by the cache adaptation agent, the cache in use by at least one of the applications, the monitoring covering at least a size of the cache used by the application, how many objects are in the application's cache, and sizes of the objects in the application's cache; and configuring, by the cache adaptation agent and based on the monitoring, at least one of the cache and system behavior regarding at least one of the applications.

Implementations can include any or all of the following features. The monitoring also includes determining how many times the application writes to the disk storage. The monitoring also includes determining system response time. The configuration includes modifying a caching strategy. The system is operated by a vendor and each of the applications is used by one of multiple customers, and the method further includes determining a total cost of ownership for the vendor per each of the customers. The configuration includes creating an index for the disk storage. The configuration includes providing a recommendation to a user, the recommendation indicating at least one task for the user to perform.

Implementations can provide any or all of the following advantages. In a system that is used for multiple customers, the amount of memory used by each customer can be reduced, allowing more customers to be held on a single system. Cache use can be made more effective. System performance can be improved. Scalability and/or system stability can be improved. Elastic cache configuration can be provided.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes methods and systems in which a cache is adaptively configured. In a system where applications are using a cache, an agent can be implemented that analyzes the cache and configures the cache and/or system behavior based on one or more rules. For example, the adaptive configuration can involve allocating more (or less) cache space to an application, causing the application to cache more (or fewer) objects when it performs its operations, and/or to make other changes in caching strategy.

Figure 1:
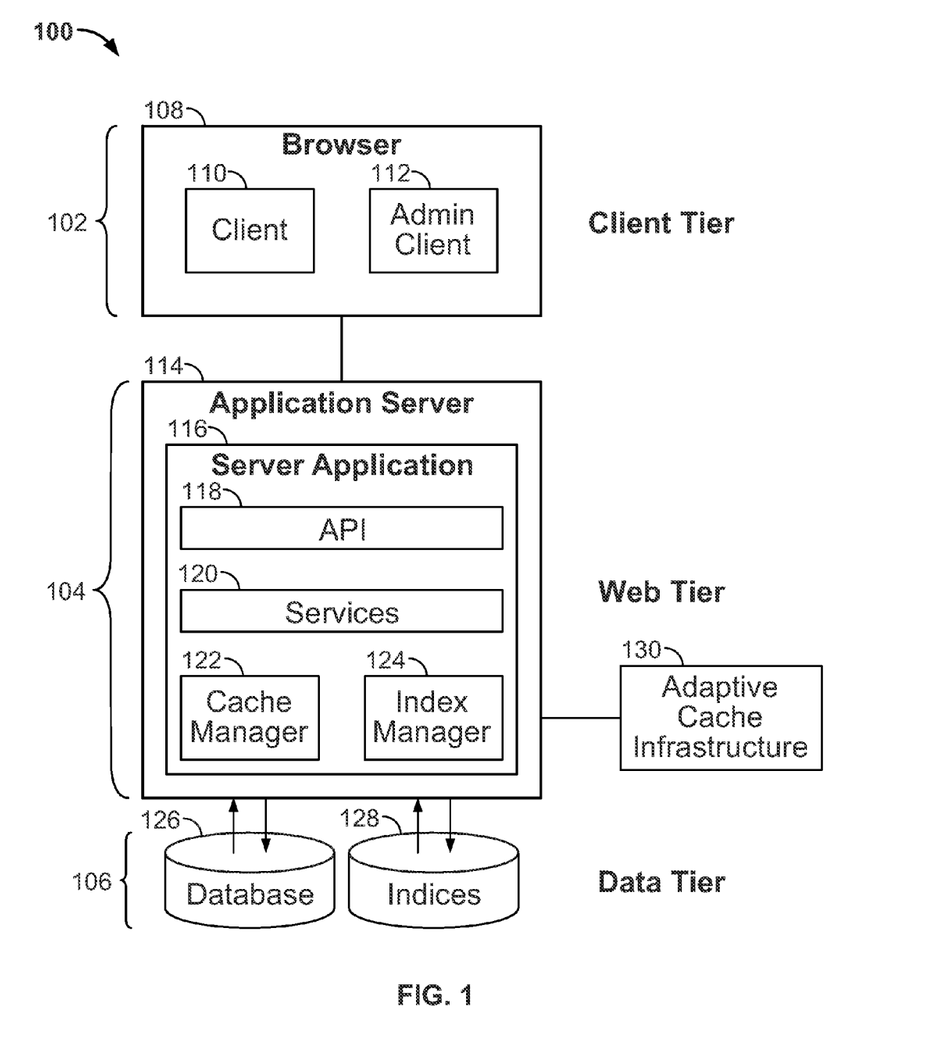
FIG. 1 shows an example of a system architecture for adaptive configuration of a cache.

FIG. 1 shows an example of a system architecture 100 for adaptive configuration of a cache. The architecture 100 can be implemented in form of tiers. Here, for example, the architecture includes a client tier 102, a web tier 104 and a data tier 106. More or fewer tiers can be used in some implementations.

The client tier 102 is implemented on one or more devices, for example a smartphone, personal computer and/or a tablet. The client tier includes one or more browsers 108. In some implementations, any suitable browser can be used, including, without limitation, a Google Chrome browser, an Internet Explorer browser, a Safari browser or a Firefox browser.

Here, the browser 108 includes at least one client 110 and an admin client 112. For example, the client 110 is a browser-compatible instance of an application client and can be created using any suitable code or programming language. A user can operate the client 110 to cause one or more functions to be performed. The admin client 112 can serve one or more purposes of administration, configuration or other preparation and/or restoration. In some implementations, the client 110 and/or the admin client 112 are implemented outside the browser 108, for example in a standalone configuration.

The web tier 104 here includes an application server 114 in connection with the browser 108. The application server 114 can have stored therein, and execute, one or more applications of any type. In some implementations, the application server 114 includes a server application 116. For example, the server application can provide an application programming interface (API) 118, one or more services 120, a cache manager 122 and an index manager 124.

The data tier 106 here includes one or more databases 126 and one or more indices 128. In some implementations, the API 118 can provide the client tier 102 access to one or more of the services 120, which service(s) can involve accessing the database 126 and/or using cached information managed by the cache manager 122. For example, If at least part of the database 126 is indexed, the index can be stored in the indices 128 and used by the index manager 124 to facilitate database lookup.

The architecture can include an adaptive cache infrastructure (ACI) 130. In this implementation, the ACI 130 is implemented in the web tier 104. For example, the ACI can analyze use of the cache(s) in the architecture 100 and/or monitor system response time. Based on the analysis and/or monitoring, the ACI 130 can cause one or more changes to be made in an effort to optimize cache usage. For example, more or less cache space can be allocated and/or the caching strategy can otherwise be changed. As another example, if the ACI 130 detects that the database 126, or certain data structures therein, do not have an index, then an index can be created, such as by indexing the contents and providing the index for management by the index manager 124. Creating such an index can speed up database accesses and thereby improve system performance.

Figure 2:
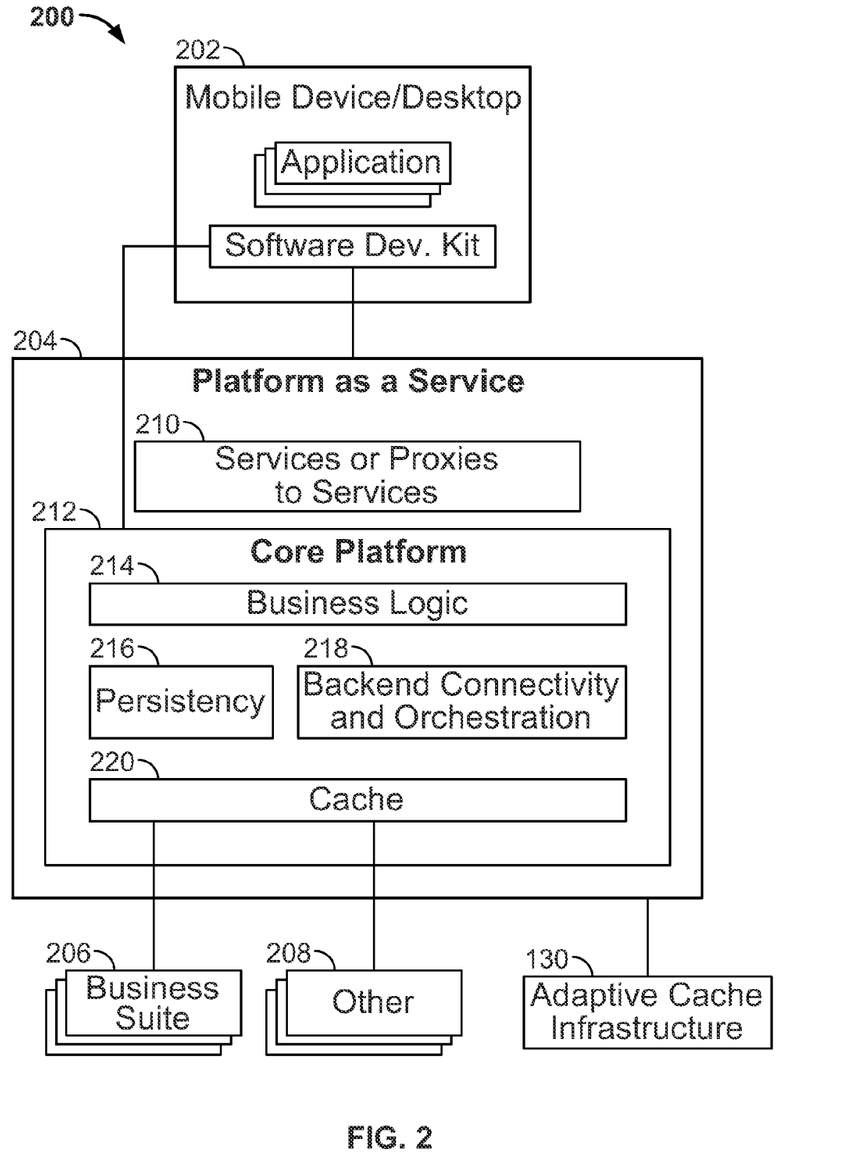
FIG. 2 shows an example of a system for adaptive configuration of a cache.

FIG. 2 shows an example of a system 200 for adaptive configuration of a cache. Here, the system 200 includes at least one device 202, for example a mobile device or a desktop on a personal computer. As other examples, a smartphone, tablet or other handheld device can be used. In some implementations, the system 200 is utilized to perform operations by one or more users who gain access using the device(s) 202.

The system 200 provides a platform for hosting and executing the operative functionality that users will seek access to. Here, a platform-as-a-service (PaaS) 204 is included in the system 200. For example, the PaaS 204 can be implemented using any suitable script or programming language, including, but not limited to, Java.

The system 200 can include one or more business suites 206 and/or at least one other application 208. In some implementations, applications relating to enterprise resource management (ERP) can be used. For example, business suite software from SAP AG can be used.

The PaaS 204 here includes one or more services or proxies to services 210. Such services and/or proxies can relate to activities (e.g., an activity controller, runtime container or runtime content composition), navigation, search, documents, real-time communication (e.g., desktop sharing, chat, audio/video conferencing), feeds (e.g., status updates, system feeds or feed aggregation), content composition (e.g., thing collection), user interface composition (e.g., Pagebuilder, OpenSocial container), networks (e.g., groups, communities, implicit networks, explicit networks), people (e.g., profile, reference to third party profiles, presence), context awareness (e.g., business object, task, role), location services, discussions, blogs, wiki, commerce, loyalty, payments, coupons and/or usage analytics. In some implementations, one or more of the services and/or proxies 210 can be implemented as Open Services Gateway initiative bundles.

The PaaS here includes a core platform 212. The core platform can provide business logic, persistency, lifecycle management (e.g., for an application) and connectivity to remote business logic. In some implementations, the core platform is used in a true multichannel architecture. The core platform 212 here includes business logic 214, a persistency module 216, backend connectivity and orchestration 218 and at least one cache 220. The business suite 206 and/or the other application 208 can be connected to, and interact with, the cache 220. In some implementations, one or more gateways can be used between the cache and the (business suite) application.

The system 200 here includes the adaptive cache infrastructure 130. In some implementations, the adaptive cache infrastructure 130 can monitor the system 200, including the cache 220, and take one or more actions based on the analysis. For example, the cache 220 can be modified regarding how much space is allocated to the business suite 206 and/or to the other application 208. As another example, the object(s) used by the (business suite) application can be cached, if that leads to time saving, or not cached, if the object takes up too much cache space or is not used frequently.

In a particular implementation, the system 200 is operated by a vendor and each of the applications in the system is used by one of multiple customers. For example, the vendor provides remotely accessible ERP services to different customers. A total cost of ownership (TCO) for the vendor can then be determined for each of the customers. For example, the adaptive cache infrastructure 130 can monitor how much of the cache 220 is occupied by the application(s) of each respective customer, and the cost per customer (or per application) can be calculated.

Figure 3:
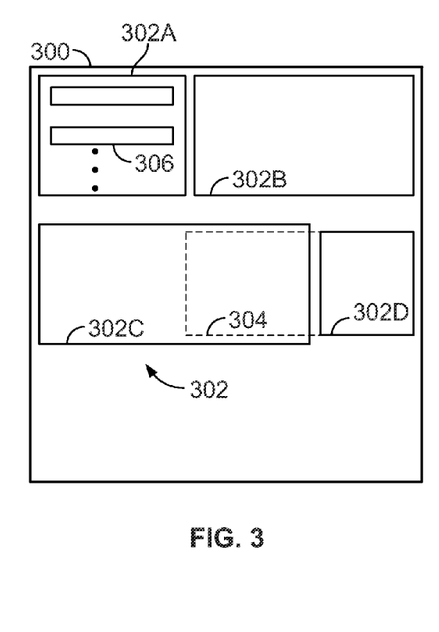
FIG. 3 schematically shows a cache being adaptively configured.

FIG. 3 schematically shows a cache 300 being adaptively configured. The cache 300 can be implemented using any suitable storage technology, such as a memory. In some implementations, the cache 300 in used in the system 200 (FIG. 2).

The cache 300 includes multiple areas 302 associated with respective applications. For example, each of areas 302A-D can be allocated to, and used in the operation of, a separate application program. The areas 302A-D are schematically shown as contiguous fields in this example, but in some situations one or more of the areas 302 can be distributed over two or more physical locations.

For each of the areas 302A-D, it can be determined (e.g., by the adaptive cache infrastructure 130 in FIG. 1) whether to allow more or less memory space based on usage. For example, an area can be duplicated (one or more times) or discarded. This can help lower the TCO in that only the needed resources are being used. In some implementations, respective modules corresponding to the areas 302A-D can provide interfaces that expose their load factors. In other implementations, operating system metrics such as CPU use and/or memory use, can be used (e.g., by the adaptive cache infrastructure 130 in FIG. 1).

A dashed outline 304 schematically illustrates that the area 302D previously were larger than it currently is. For example, the area 302D may have been deliberately made smaller upon determining—e.g., based on monitoring caching activities—that the corresponding application was not using its cache space frequently enough to justify the original size of its cache. Accordingly, some cache resource that was previously available to that application was taken away to be used more efficiently. Here, for example, the area 302C has been allowed to expand into some of the space previously occupied by the area 302D. In some situations, the allocation of more cache space to the area 302C—i.e., to the corresponding application that uses the space 302C—can also or instead be prompted by analysis showing that the corresponding application needed more cache space. For example, it can be determined that the corresponding application accesses the database frequently and as such it can be advantageous to allow the application more cache.

In some implementations, the analysis also or instead relates to one or more objects 306 that an application stores in the cache 300. For example, the number of objects 306 can be determined, and the size of the area 302A can be adjusted up or down accordingly. As another example, if one or more of the objects 306 is too large (i.e., takes up too much space) then the caching behavior can be changed so that the too-large object 306 is no longer cached.

One or more of the following aspects can be taken into account: the size of the object; the relative cost of creating the object; or how frequently the object changes. For example, it can be determined that an application accesses a particular object only within a confined time interval (e.g., twice in less than one minute). The cache can then be configured so that after that short time (e.g., after one minute) the area is reallocated (possibly to another application). Other approaches can be used.

As another example, it can be determined from analyzing caching activities that an application uses the cache mostly between 9.00 AM and 5.00 PM in a particular time zone, and/or that another application does not use the cache during the noon hour. Accordingly, based on the monitoring the appropriate caching behavior can be implemented so as to make more effective use of system resources.

That is, the system usage is monitored (e.g., by the adaptive cache infrastructure 130 (FIG. 1) and accordingly the following, for example, can be increased or decreased:
Low level application cache (e.g., based on specific cache areas)
Each module in the system
The underlying hardware using virtualization (e.g., CPU, RAM, memory, memory bandwidth, network bandwidth, etc.)

Figure 4:
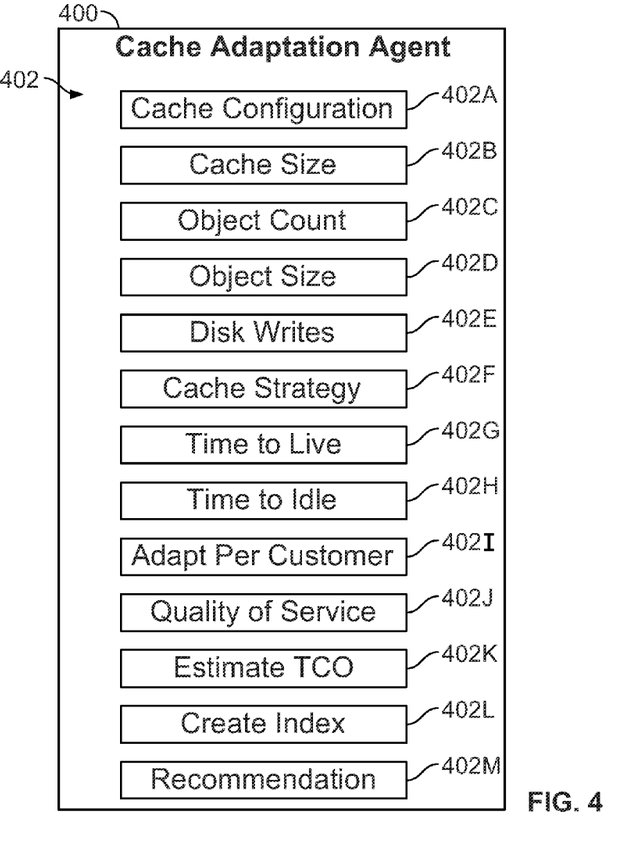
FIG. 4 shows an example of a cache adaptation agent.

FIG. 4 shows an example of a cache adaptation agent 400. The agent 400 can be implemented using any suitable script or programming language. For example, the agent 400 can be included in the adaptive cache infrastructure 130 (FIGS. 1-2).

In a particular example, the cache adaptation agent 400 can be implemented in a system that includes a memory and a disk storage, and has multiple applications (e.g., the architecture 100 in FIG. 1 or the system 200 in FIG. 2). The system creates a cache in the memory for use by each of the applications. The cache adaptation agent 400 can monitor at least a size of the cache used by the application, how many objects are in the application's cache, and sizes of the objects in the application's cache. For example, the sizes of the areas 302 (FIG. 3) can be monitored, as well as the number and sizes of the objects 306 (FIG. 3). Based on the monitoring, the cache adaptation agent can modify the cache and/or system behavior regarding at least one of the applications. For example, one or more applications can be allocated more (or less) cache; the number of objects in the cache can be decreased (or increased); or the size of objects in the cache can be decreased (or increased).

The cache adaptation agent 400 can perform monitoring at suitable times. In some implementations, the agent monitors system activities essentially in a continuous fashion and can take action when justified by the analysis. In other implementations, the monitoring is performed at one or more specified times.

The cache adaption agent 400 monitors the running system. In some implementations, the agent is implemented inside the running process. In other implementations, the agent can be run in a separate place, for example so that multiple systems can be monitored.

The cache adaptation agent 400 can include one or more modules 402 to perform relevant monitoring and/or to take suitable measures in response. Here, the agent 400 includes the following:

A cache configuration module 402A. For example, the module 402A controls how the cache configuration is modified based on monitoring and analysis.

A cache size module 402B. For example, the module 402B determines the size of the cache for one or more particular applications.

An object count module 402C. For example, the module 402C can count the number of the objects 306 (FIG. 3) in one or more areas of the cache.

An object size module 402D. For example, the module 402D can determine the size of one or more of the objects 306 (FIG. 3).

A disk write module 402E. For example, the module 402E can determine how many times an application writes to disk storage.

A cache strategy module 402F. For example, the module 402F can maintain information about which cache strategy is used (e.g., least recently used, most recently used, or a custom strategy) based on business logic, and cause a change or modification in strategy to be made.

A time to live module 402G. For example, the module 402G can maintain information about the time-to-live for any of the objects 306 (FIG. 3) and cause a change to be made based on the monitoring. This analysis can be done based on cache usage per cache area.

A time to idle module 402H. For example, the module 402H can maintain information about the time-to-idle for any of the objects 306 (FIG. 3) and cause a change to be made based on the monitoring.

An adapt per customer module 402I. For example, the module 402I can adapt a heap size per customer based on the monitoring and analysis.

A quality of service module 402J. For example, the module 402J can maintain information about the quality of service used by any application and cause a change to be made based on the monitoring.

An estimate TCO module 402K. For example, the module 402K can estimate the TCO for a vendor who provides application and/or processing space to one or more customers.

A create index module 402L. For example, the module 402L can create an index for the database 126 (FIG. 1) if the monitoring and analysis indicate that database access times need to be reduced.

A recommendation module 402M. For example, the module 402M can provide a recommendation to a user to perform at least one task (e.g., change caching strategy, increase total cache space, reduce the number of applications in the system).

Figure 5:
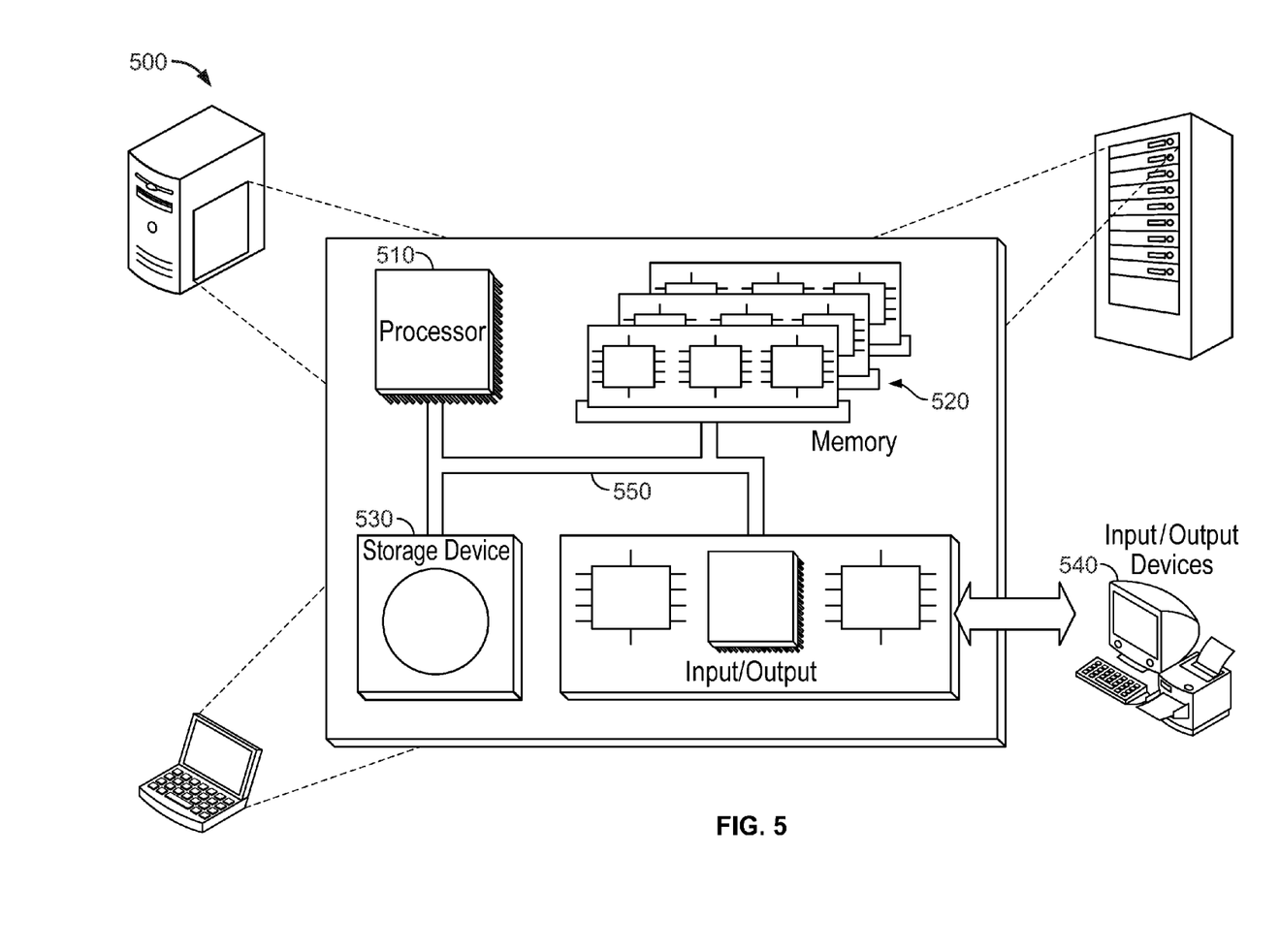
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for adaptively configuring a cache, the method comprising:
   implementing a cache adaptation agent in a system that has multiple applications, the system including a memory and a disk storage, wherein the system creates a cache in the memory for use by each of the applications;
   monitoring, by the cache adaptation agent, the cache in use by at least one of the applications, the monitoring covering at least a size of the cache used by the application, how many objects are in the application's cache, and sizes of the objects in the application's cache; and
   configuring, by the cache adaptation agent and based on the monitoring, at least one of the cache and system behavior regarding at least one of the applications, wherein the configuration comprises providing a recommendation to a user, the recommendation indicating at least one task for the user to perform.

2. The computer-implemented method of claim 1, wherein the monitoring also comprises determining how many times the application writes to the disk storage.

3. The computer-implemented method of claim 1, wherein the monitoring also comprises determining system response time.

4. The computer-implemented method of claim 1, wherein the configuration comprises modifying a caching strategy.

5. The computer-implemented method of claim 1, wherein the system is operated by a vendor and each of the applications is used by one of multiple customers, the method further comprising determining a total cost of ownership for the vendor per each of the customers.

6. The computer-implemented method of claim 1, wherein the configuration comprises creating an index for the disk storage.

7. A computer program product embodied in a non-transitory computer-readable storage medium and comprising instructions that when executed by a processor perform a method for adaptively configuring a cache, the method comprising:
implementing a cache adaptation agent in a system that has multiple applications, the system including a memory and a disk storage, wherein the system creates a cache in the memory for use by each of the applications;
monitoring, by the cache adaptation agent, the cache in use by at least one of the applications, the monitoring covering at least a size of the cache used by the application, how many objects are in the application's cache, and sizes of the objects in the application's cache; and
configuring, by the cache adaptation agent and based on the monitoring, at least one of the cache and system behavior regarding at least one of the applications, wherein the configuration comprises providing a recommendation to a user, the recommendation indicating at least one task for the user to perform.

8. The computer program product of claim 7, wherein the monitoring also comprises determining how many times the application writes to the disk storage.

9. The computer program product of claim 7, wherein the monitoring also comprises determining system response time.

10. The computer program product of claim 7, wherein the configuration comprises modifying a caching strategy.

11. The computer program product of claim 7, wherein the system is operated by a vendor and each of the applications is used by one of multiple customers, the method further comprising determining a total cost of ownership for the vendor per each of the customers.

12. The computer program product of claim 7, wherein the configuration comprises creating an index for the disk storage.

13. A system comprising:
one or more processors; and
computer program product embodied in a non-transitory computer-readable storage medium and comprising instructions that when executed by a processor perform a method for adaptively configuring a cache, the method comprising:
implementing a cache adaptation agent in the system that has multiple applications, the system including a memory and a disk storage, wherein the system creates a cache in the memory for use by each of the applications;
monitoring, by the cache adaptation agent, the cache in use by at least one of the applications, the monitoring covering at least a size of the cache used by the application, how many objects are in the application's cache, and sizes of the objects in the application's cache; and
configuring, by the cache adaptation agent and based on the monitoring, at least one of the cache and system behavior regarding at least one of the applications, wherein the configuration comprises providing a recommendation to a user, the recommendation indicating at least one task for the user to perform.

14. The system of claim 13, wherein the monitoring also comprises determining how many times the application writes to the disk storage.

15. The system of claim 13, wherein the configuration comprises modifying a caching strategy.

16. The system of claim 13, wherein the system is operated by a vendor and each of the applications is used by one of multiple customers, the method further comprising determining a total cost of ownership for the vendor per each of the customers.

17. The system of claim 13, wherein the configuration comprises creating an index for the disk storage.

* * * * *